June 21, 1932.  C. L. EASTBURG  1,864,508

TRUCK FRAME CONSTRUCTION

Filed Dec. 11, 1931  2 Sheets-Sheet 1

INVENTOR:
Clifford R. Eastburg,
by Carr Kerr & Gravely,
HIS ATTORNEYS.

June 21, 1932.  C. L. EASTBURG  1,864,508
TRUCK FRAME CONSTRUCTION
Filed Dec. 11, 1931    2 Sheets-Sheet 2
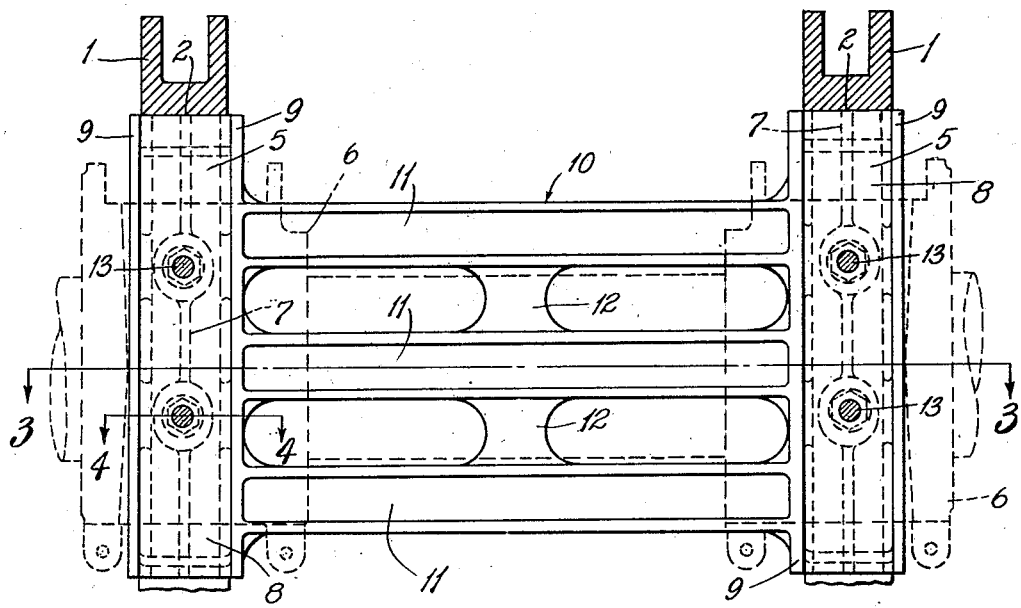
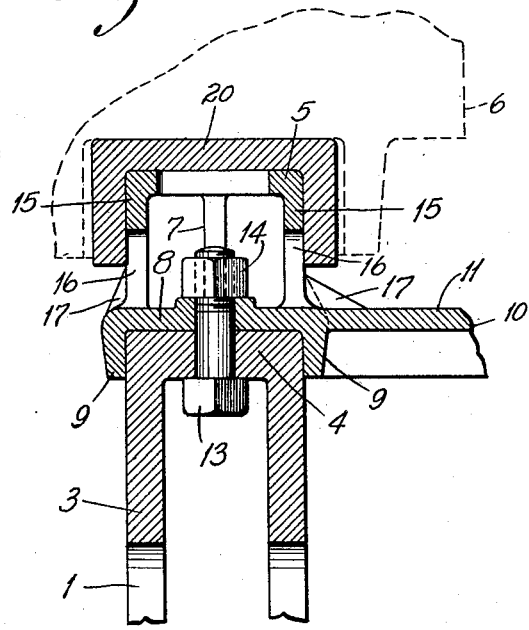
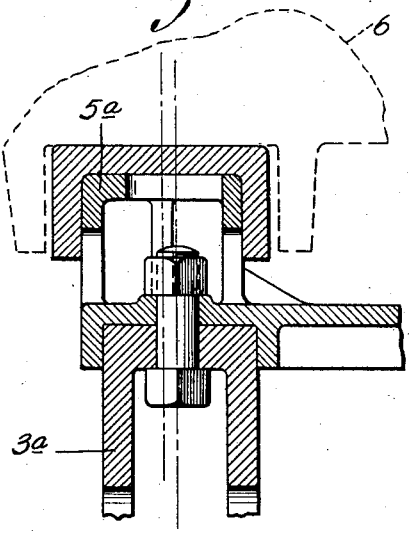
INVENTOR:
Clifford L. Eastburg,
by Carr Kam & Gravely,
HIS ATTORNEYS.

Patented June 21, 1932

1,864,508

UNITED STATES PATENT OFFICE

CLIFFORD L. EASTBURG, OF CANTON, OHIO, ASSIGNOR TO THE TIMKEN ROLLER BEARING COMPANY, OF CANTON, OHIO, A CORPORATION OF OHIO

TRUCK FRAME CONSTRUCTION

Application filed December 11, 1931. Serial No. 580,242.

This invention relates to railway truck constructions, particularly to railway locomotive truck frame construction wherein the longitudinal distances between truck pedestals can be varied to accommodate journal boxes of different sizes. Up to the present, this has been accomplished by securing separate filler devices to the truck pedestals which may be removed to accommodate wider journal boxes. These filler devices, however, are apt to loosen during operation of the truck and are liable to "cock" or tilt with respect to the truck pedestal which is obviously undesirable; and the principal object of this invention is to provide means for resisting such "cocking" action, and also to strengthen the truck frame.

My invention consists principally in connecting opposite filler devices on each side of a truck frame with transverse members to prevent "cocking" or tilting of the filler devices. My invention consists in the railway truck frame construction and in the parts and combinations and arrangements of parts hereinafter described and claimed.

In the accompanying drawings which form part of this specification and wherein like reference numerals refer to like parts wherever they occur, Fig. 1 is a side view of a portion of a railway truck frame showing a journal box receiving opening equipped with removable filler devices embodying my invention, Fig. 2 is a sectional view along the line 2—2 in Fig. 1, the pedestal portion of the side frame being removed.

Fig. 4 is an enlarged sectional view along the line 4—4 in Fig. 2, and

Fig. 5 is a view similar to Fig. 4 showing a modified form of the invention.

Figure 1:
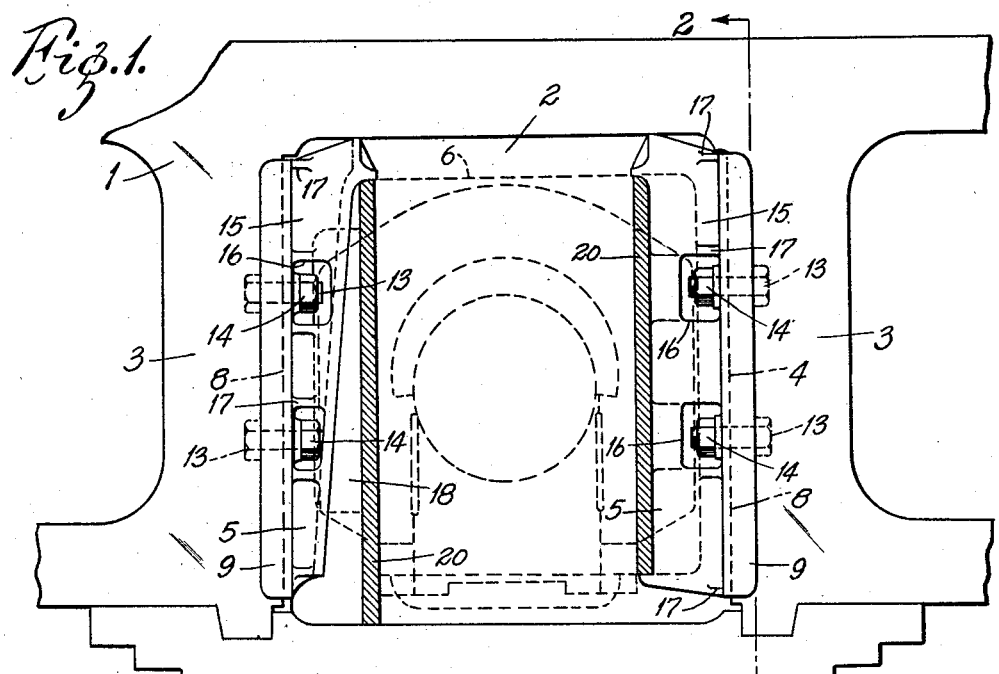
Figure 3:
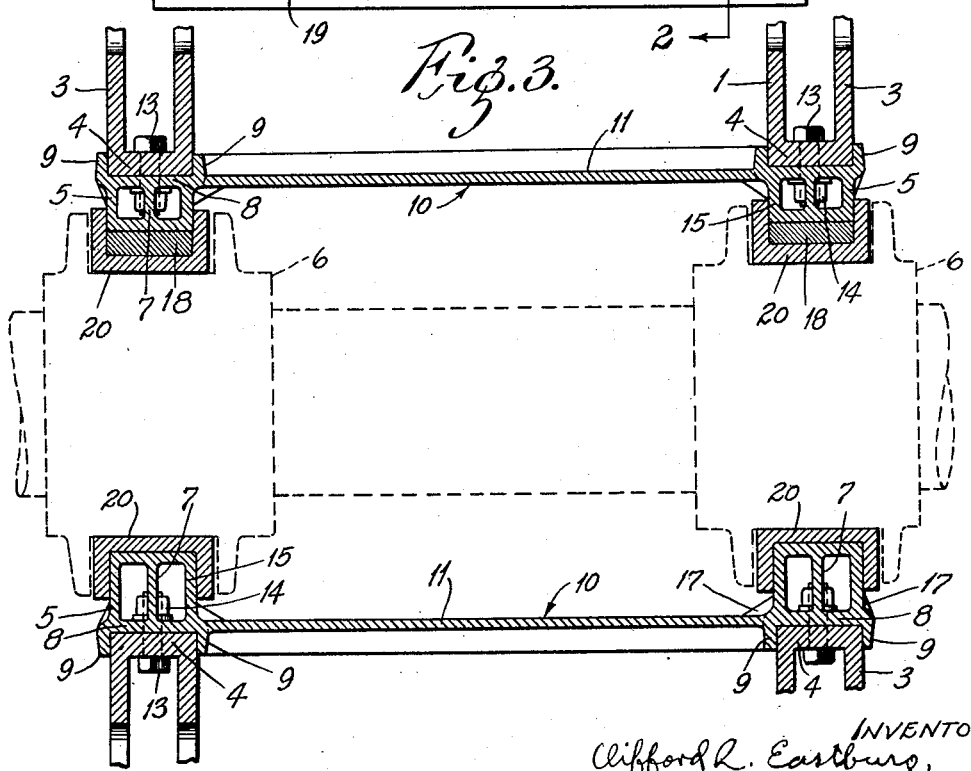
Fig. 3 is a sectional view along the line 3—3 in Fig. 2.

In the accompanying drawings, I have shown a railway locomotive truck frame 1 provided with jaw openings 2 defined by channel-shaped pedestals 3 having their web portions 4 constituting the side walls of the jaw openings. These side walls are equipped with novel filler devices 5 adapted to be inserted between a plain bearing journal box 6 (shown in dotted lines) and the truck pedestal 3; but, which devices 5 may be removed to lengthen the jaw opening in order to accommodate an anti-friction journal box which is larger than a plain journal box.

The filler devices 5 comprise a hollow rectangular member having a middle longitudinal web 7 extending therethrough. One side 8 of the filler member fits against the web 4 of the pedestal and is widened out a slight amount on each side of the pedestal and has longitudinal flanges 9 extending along each side of the pedestal.

Connecting the opposite inner longitudinal flange portions 9 of the filler devices on each side of the truck frame are integral transverse perforated framelike members 10; and in the construction illustrated, I have shown the frame member 10 as being of integral construction and comprising three main transverse portions 11 extending between the top portions, middle portions and bottom portions, respectively, of the filler devices, with the main transverse portions being connected in the middle of the frame by small vertical members 12.

Each filler device is secured to the web portion of the pedestal by bolts 13 extending therethrough and through holes in the abutting side of the hollow filler device, the end portions of said bolts receiving nuts 14 within the hollow filler member; and the middle web portion thereof being cut away adjacent to each bolt opening to accommodate the bolt and nut therefor; and the sides 15 of said hollow member are also provided with holes 16 therethrough in order to get at the nuts 14. Preferably, small diagonal webs 17 are provided at the top and bottom of each of these openings and at the top and bottom of the hollow filler members in order to strengthen them.

The filler member on one side of each jaw opening is tapered from its top to a narrow bottom portion, in order to allow the insertion of a usual wear compensating wedge 18; and this wedge is held in place by a customary pedestal tie member 19, extending across the bottom of the jaw opening and suitably secured to the bottom of the side frame. Preferably, instead of having the journal box directly engage the outer face of the filler device, U-shaped wear plates 20 are fitted around the filler device on the one side and around the wedge on the other side as is customary in railway truck journal box and pedestal constructions of this kind.

In equipping truck frames with filler devices, in certain instances it may be desirable or necessary to alter the transverse spacing between opposite pedestal members on each side of the frame. For example, when plain bearing journal boxes are substituted for anti-friction journal boxes it is desirable to have the plain bearing journal boxes at opposite ends of an axle, spaced farther apart than the anti-friction journal boxes were spaced; and the modified form of filler device illustrated in Fig. 5 was designed to accomplish this end. In Fig. 5, the modified form of filler device 5a is attached to the frame pedestal 3a in the same manner as the preferred form and it is of similar construction thereto with the exception that the center line of the hollow rectangular portion of the filler device 5a is offset from that of the plain pedestal whereby the transverse spacing between the center lines of the hollow filler devices at opposite sides of the frame is greater than that between the center lines of the frame pedestals to which the filler devices are attached.

Obviously, my invention is a decided improvement over that of using separate filler devices. With single blocks inserted between the plain journal box and the truck pedestal and bolted thereto, it is obvious that the bolts are liable to loosen with the result that the filler pieces can move or tilt with respect to the truck pedestals and this cocking action may cause serious disalignment of the axle resulting in a short life of the truck. With my transverse frame arrangement, however, this cocking action is obviously reduced to a minimum on account of the long lever arm effect produced by the tieing frame and hence with my construction there can be no serious "cocking" which might produce disalignment of the axle.

Obviously, the construction hereinabove described admits of considerable variations without departing from the spirit of my invention. For instance, instead of connecting opposite filler devices with an integral transverse frame, it may be desirable to use one or more transverse tie bars either made as an integral part of the filler devices or else made separate and secured thereto by any suitable means. Furthermore, while I have shown (in the modified form of my invention) the hollow filler device member offset to the outside of the frame pedestal, it is obvious that, should the occasion arise, the hollow portion of the filler device could be offset to the inside of the frame pedestal. Also, while my invention is shown in connection with a locomotive truck, it is to be understood that it is applicable to other kinds of trucks, and as many other variations may be desirable, I do not wish to limit my invention to the precise construction shown and described.

What I claim is:

1. In a railway truck having journal box receiving openings, a member adapted to be inserted between the wall of an opening and a journal box therein and another member adapted to be inserted between the wall of the opposite opening on the other side of the truck and its journal box, said members being connected by a transverse member.

2. In a railway truck having journal box openings defined by pedestal legs, a member secured to one of said pedestal legs and another member secured to the opposite pedestal leg on the other side of the truck, said members being connected by a transverse member.

3. In a railway truck having journal box openings defined by pedestal legs, a hollow member secured to the pedestal leg by means of bolts and a similar member secured to the opposite pedestal leg on the other side of the truck, said members being connected by an integral transverse frame.

4. In a railway truck having journal box receiving openings defined by channel-shaped pedestals having their web portions constituting the walls of said openings, a hollow rectangular filler member secured to the web portion of a pedestal leg by means of bolts extending therethrough and through the abutting side of the hollow member, nuts assembled on the ends of said bolts, said hollow member having a vertical web along its middle which is cut away to make room for the nuts and also having holes in its side to get at the nuts, said hollow member having a longitudinal flange extending along each side of the pedestal leg, and a similar filler member secured to the opposite pedestal leg on the other side of the truck, said filler members being connected by a perforated transverse frame member.

5. In a railway truck having journal box receiving openings defined by pedestal legs, a filler member secured to one of said pedestal legs in such manner that its center line is offset with respect to the center line of the pedestal leg and another filler member secured to the opposite pedestal leg on the other side of the truck, said filler members being connected by a transverse member.

Signed at Canton, Ohio, this 5th day of December, 1931.

CLIFFORD L. EASTBURG.